United States Patent [19]
Beard

[11] Patent Number: 5,826,897
[45] Date of Patent: Oct. 27, 1998

[54] MANUALLY POWERED VEHICLE HAVING A FLYWHEEL ASSISTED DRIVE

[76] Inventor: David L. Beard, 449-1 Centerhill Rd., Upper Black Eddy, Pa. 18972

[21] Appl. No.: 584,104

[22] Filed: Jan. 11, 1996

[51] Int. Cl.$^6$ ...................................................... B62M 1/04
[52] U.S. Cl. ...................... 280/250.1; 280/217; 280/244; 280/264
[58] Field of Search .................................... 280/217, 244, 280/212, 214, 215, 263, 264, 211, 253, 250.1

[56] References Cited

U.S. PATENT DOCUMENTS

| | | |
|---|---|---|
| 1,600,131 | 9/1926 | Overton . |
| 3,666,292 | 5/1972 | Bartos . |
| 4,560,181 | 12/1985 | Herron . |
| 4,592,570 | 6/1986 | Nassiri ..................................... 280/650 |
| 4,705,284 | 11/1987 | Stout . |
| 4,762,332 | 8/1988 | Seol ..................................... 280/250.1 |
| 4,768,607 | 9/1988 | Molina .................................... 280/217 |
| 4,779,485 | 10/1988 | Dollison et al. ......................... 280/217 |
| 4,811,946 | 3/1989 | Horn . |
| 5,007,655 | 4/1991 | Hanna . |

OTHER PUBLICATIONS

John Remling; Steering and Suspension, Second Edition; p. 222, Oct. 1983.

*Primary Examiner*—Brian L. Johnson
*Assistant Examiner*—Avraham Lerner

[57] ABSTRACT

A human powered vehicle, such as a wheelchair or recumbent vehicle, that has a flywheel assisted drive. The human powered vehicle includes a frame that rides upon at least two wheels. A seat is supported by the frame. Adjacent to either side of the seat is a rowing lever used to turn the flywheel. Each rowing lever is coupled to a mechanism that converts the reciprocal movement of the rowing lever into a rotational movement that is applied to the flywheel. The flywheel is coupled to at least one of the wheels that supports the frame, via a transmission that selectively transfers the rotational movement of the flywheel to the wheels. As a result, the rowing levers do not directly drive the wheels of the vehicle. Rather, the rowing levers drive the flywheel and the flywheel drives the wheels. By using a transmission that selectively couples the flywheel to the vehicle's wheels, the transmission can be set in a neutral condition whereby the rotational movement of the flywheel is not transferred to the vehicle's wheels. As a result, the rowing levers can be used to drive the flywheel to a high rate of speed before the flywheel engages the vehicles wheels.

14 Claims, 4 Drawing Sheets

MANUALLY POWERED VEHICLE HAVING A FLYWHEEL ASSISTED DRIVE

BACKGROUND OF THE INVENTION

1. Field of the Invention

The present invention relates to human powered vehicles such as wheelchairs, hand-powered cycles and other vehicles at least partially powered by the use of the driver's arms. More particularly, the present invention relates to wheelchairs and like vehicles that include a flywheel as part of the vehicle drive mechanism to enhance speed on inclines and to store energy for selective future use.

2. Prior Art Statement

Wheelchairs and like vehicles have long been used by paraplegics, amputees and others who do not have full use of their legs to provide mobility. Over the years there have been a wide variety of different wheelchair designs produced. However, a common feature of most wheelchairs that are manually operated is that the wheelchair is driven by the arms of the person in the wheelchair. The traditional wheelchair has large wheels that can be reached and turned by the person sitting in the wheelchair. A person using such a traditional hand-on-wheel wheelchair controls the movement of the wheelchair and the turning of the wheelchair by selectively rotating the wheels of the wheelchair. A problem with traditional wheelchairs with hand-on-wheel drive, is that the turning of the wheels by hand is not an efficient use of the muscles in the arm. Consequently, a disproportionate amount of effort must be exerted by the person in the wheelchair in order to propel or turn the wheelchair.

In the prior art, there have been many wheelchair designs that have attempted to make more efficient use of the arms when driving the wheelchair. A common design for this purpose includes rowing levers that are reciprocally moved back and forth by the arms. The use of rowing levers permits a person in a wheelchair to sit upright in the chair and use both the chest and arm muscles to push and pull the rowing levers back and forth. Pushing and pulling with the arms is a fairly efficient use of the arms and chest muscles, thereby resulting in a more labor efficient drive mechanism. Prior art wheelchairs that use rowing levers are exemplified by U.S. Pat. No. 3,666,292 to Bartos, entitled WHEELCHAIR; U.S. Pat. No. 4,811,964 to Horn, entitled WHEELCHAIR PROPELLED BY ROWING; and U.S. Pat. No. 5,007,655 to Hanna, entitled VARIABLE SPEED LEVER PROPELLED WHEELCHAIR.

Although wheelchair designs that include rowing levers are more labor efficient than traditional hand-on-wheel driven wheelchairs, the mechanical advantage provided by the rowing levers is not particularly high. In other words, force applied by the hands on the lever is not greatly increased by the mechanical drive mechanism before that force is applied to the rotation of the wheels. The low mechanical advantage of traditional rowing lever drives makes wheelchairs with such drives difficult to start from a full stop and difficult to propel up steep inclines.

In the prior art, rowing lever drives have been equipped with adjustable gear trains in order to increase the mechanical advantage of the rowing lever drive. As such, the drive train can be set to a low gear when the wheelchair is starting from a full stop or when the wheelchair is ascending an incline. Conversely, the drive train can be set to a higher gear when the wheelchair is moving or is descending an incline. Wheelchair vehicles that use rowing levers with adjustable gear drive mechanisms are exemplified by U.S. Pat. No. 4,705,284 to Stout, entitled HUMAN POWERED LAND VEHICLE.

In terms of mechanical efficiency, the performance of rowing lever wheelchairs can be greatly improved by the use of a flywheel in the drive mechanism of the wheelchair. The use of a flywheel would enable a person in the wheelchair to either store energy created by the rowing levers or store energy from the momentum of the wheelchair itself. The stored energy could then be used to assist in the propelling of the wheelchair from a dead stop or assisting the wheelchair in maintaining speed as the grade of the terrain varies. The use of an adjustable gear drive mechanism with a flywheel could then be used not just to help drive the wheelchair but to recharge the flywheel in situations where excess energy is available. Since the flywheel enables such excess energy to be stored for later use, excess energy is not wasted and the drive mechanism of the wheelchair is more efficient.

It is therefore an objective of the present invention to provide a human powered vehicle with a flywheel assisted drive in order to increase the efficiency by which the human powered vehicle can be propelled.

It is a further objective of the present invention to set forth a novel means of propelling a human powered vehicle using a flywheel assisted manual drive.

SUMMARY OF THE INVENTION

The present invention is a human powered vehicle, such as a wheelchair or recumbent vehicle, that has a flywheel assisted drive. The preferred embodiment of the present invention human powered vehicle includes a frame that rides upon at least two wheels. A seat is supported by the frame. Adjacent to either side of the seat is a rowing lever used to turn the flywheel. Each rowing lever is coupled to a mechanism that converts the reciprocal movement of the rowing lever into a rotational movement that is applied to the flywheel. The flywheel is coupled to at least one of the wheels that supports the frame, via a transmission means that selectively transfers the rotational movement of the flywheel to the wheels. As a result, the rowing levers do not directly drive the wheels of the vehicle. Rather, the rowing levers drive the flywheel and the flywheel drives the wheels. The transmission means also enables the wheels of the vehicle to turn the flywheel in situations such as braking where it is desirable to reduce the kinetic momentum of the vehicle. By using a transmission means that selectively couples the flywheel to the vehicle's wheels, the transmission means can be set in a neutral condition whereby the rotational movement of the flywheel is not transferred to the vehicle's wheels. As a result, the rowing levers can be used to drive the flywheel to a high rate of speed before the flywheel engages the vehicle's wheels. This enables the vehicle to store energy for rapid starts, ascending inclines and other situations where the application of stored energy would be beneficial to the performance of the vehicle.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the flywheel drive mechanism of the present invention can be used in any manually driven vehicle, such as a hand-cycle, bicycle, recumbent vehicle or the like, the flywheel drive mechanism is best suited for use as part of a wheelchair for the handicapped. As a result, the first embodiment of the present invention will be described as a wheelchair assembly in order to set forth the best mode contemplated for the invention.

Figure 1:
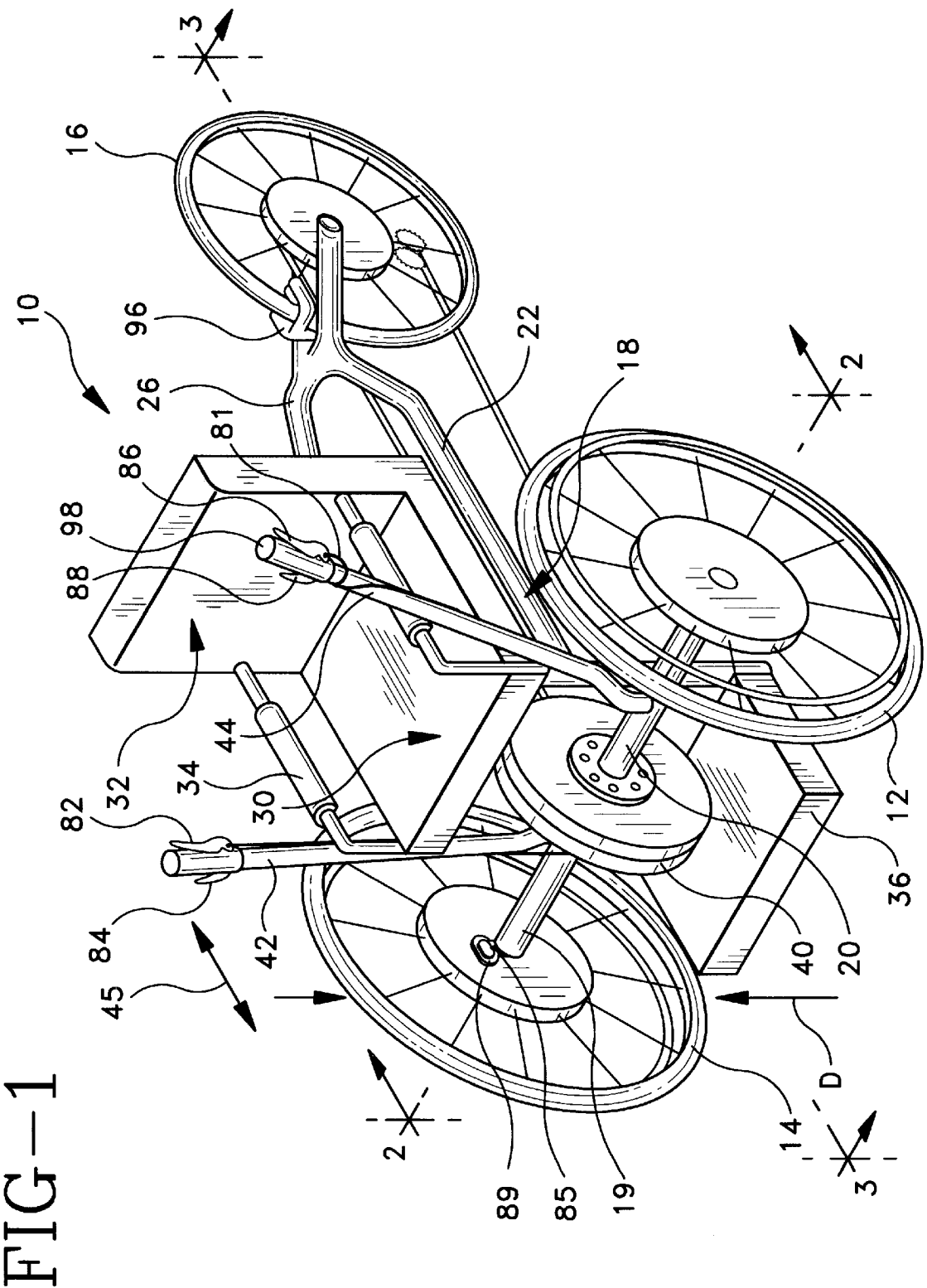
FIG. 1 is a perspective view of one preferred embodiment of the present invention human powered vehicle.

Referring to FIG. 1, a preferred embodiment of the present invention wheelchair assembly 10 is shown. The wheelchair assembly 10 is a tricycle having two large side wheels 12, 14 and a rear drive wheel 16. A rigid frame 18 joins the two side wheels 12, 14 to the rear drive wheel 16. The rigid frame 18 includes a cross frame element 20 that extends between the two large side wheels 12, 14. The cross frame element 20 has a central horizontal region 19. At both ends of the cross frame element 20 is an angled bend 19 that angles downwardly away from the central horizontal region 19. The two side wheels 12, 14 attach to the angled bends, wherein each of the side wheels 12, 14 is supported at an angle relative the vertical plane. This causes the plane of each of the side wheels 12, 14 to be angled away from rigid frame 18. The side wheels 12, 14 have a diameter D that enables the side wheels 12, 14 to be directly engaged by the hands of a person sitting in the wheelchair assembly 10. This serves as a safety feature by enabling a person in the wheelchair assembly 10 to engage the side wheels 12, 14 should the later explained stopping mechanisms or drive mechanisms fail. Another benefit to the side wheels 12, 14 being offset from the vertical plane is to allow greater ease in rotating the wheelchair assembly 10. The taper of the side wheels 12, 14 creates a narrow base that enables tighter turns than would normally be possible.

Two lateral support framing elements 22 couple the front cross frame element 20 to the rear drive wheel 16. Two seat support frame elements 26 extend upwardly from the front cross frame element 20 and curve rearwardly so as to join to the two lateral support framing elements 22 near the rear drive wheel 16. A seat 30 is coupled to the highest point of the seat support framing elements 26. The seat 30 can be of any conventional design and preferably includes a back rest 32 and large side arms 34 that would assist a disabled person in placing his/her body into the seat 30. A foot rest 36 extends from the front cross frame element 20. The foot rest 36 can be any structure capable of supporting the legs of a disabled person sitting in the wheelchair assembly 10.

As is seen in FIG. 1, a flywheel assembly 40 is disposed in the center of the front cross frame element 20 under the seat 30. Two rowing levers 42, 44 also extend upwardly from the front cross frame element 20. As will later be explained, the two rowing levers 42, 44 are used to both drive and steer the wheelchair assembly 10. The rowing levers 42, 44 are pivotably connected at their base, wherein each of the rowing levers 42, 44 can be pushed and pulled in the directions of arrow 45 by the arms of the person in the wheelchair assembly 10.

Figure 2:
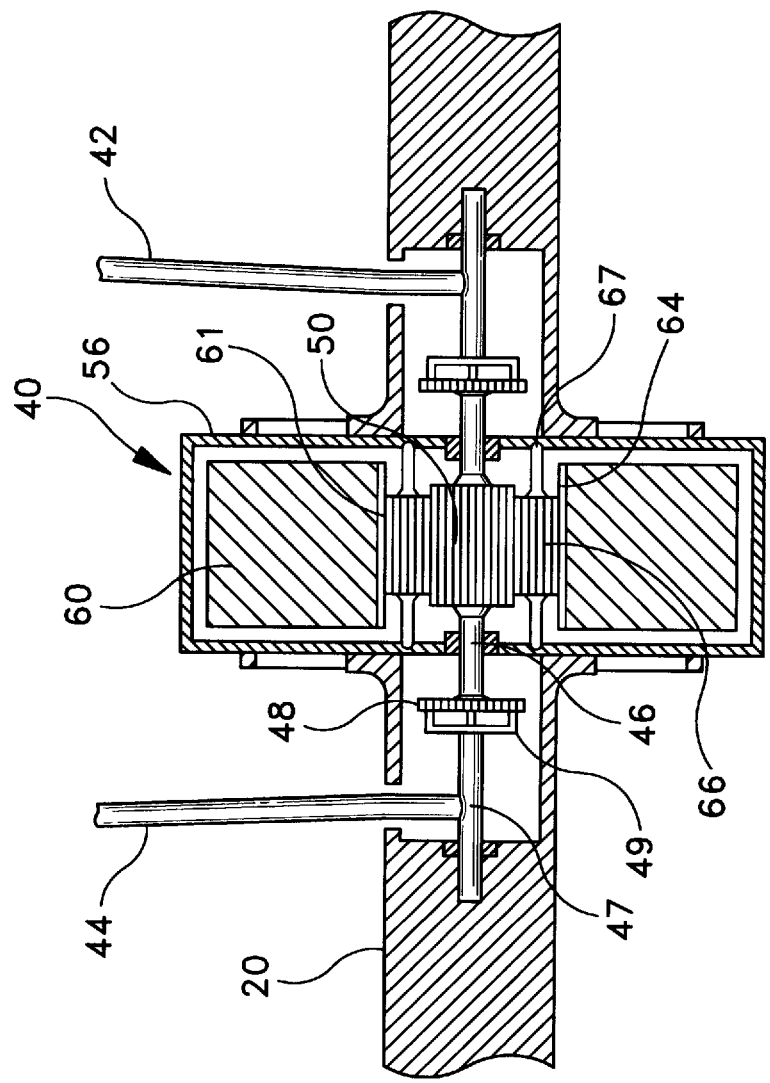
FIG. 2 is a selectively cross-sectioned view of a section of the embodiment of the present invention shown in FIG. 1, viewed along section line 2—2.

Referring to FIG. 2, it can be seen that a central drive axis 46 extends through the center of the flywheel assembly 40. A ratchet gear 48 is disposed proximate both ends of the drive axis 46, wherein the ratchet gear 48 is rigidly coupled to the drive axis 46 and turns in unison with the drive axis 46. Each of the rowing levers 42,44 is connected to a shaft 47 that is concentric with the drive axis 46. Both of the rowing levers 42, 44 include a ratchet pawl element 49 that engages the ratchet gear 48 on the drive axis 46, only when the rowing lever is pulled toward the body by a person sitting in the wheelchair assembly. Consequently, by pulling the rowing levers 42, 44 toward the body, either in unison or alternately, the ratchet pawl element 49 engages the ratchet gear 48, thereby causing the drive axis 46 to turn. The shown embodiment is merely exemplary and it will be understood that any ratchet gear configuration known in the art can be adapted for use between the rowing levers 42, 44 and the drive axis 46. The off-vertical slant of each of the side wheels 12, 14 (FIG. 1) provides extra room for the rowing levers 42, 44, wherein the side wheels 12, 14 are far enough away from the rowing levers 42, 44 so as not to interfere with their operation.

Figure 3:
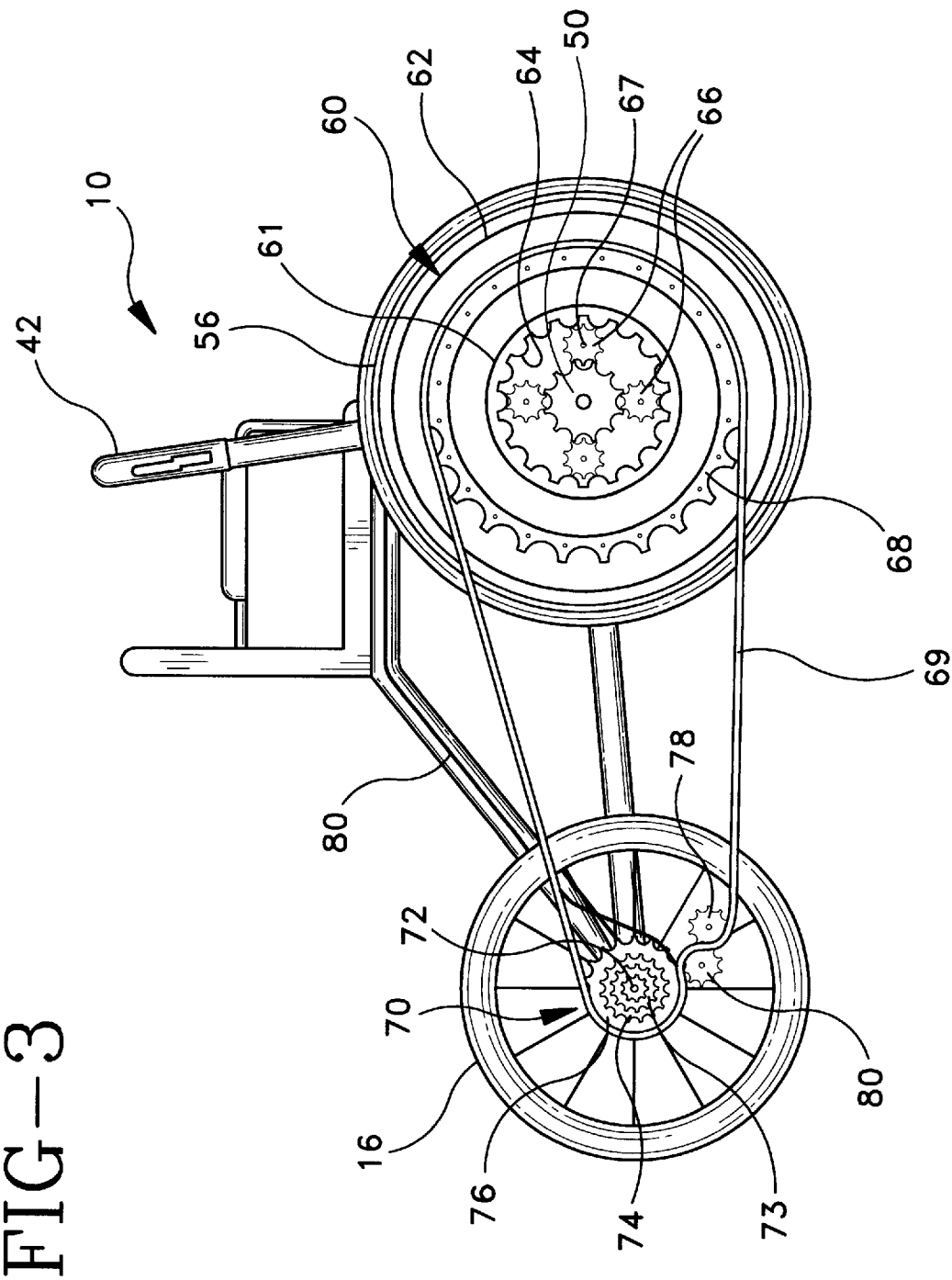
FIG. 3 is a selectively cross-sectioned view of the embodiment of the present invention shown in FIG. 1, viewed along section line 3—3.

In the center of drive axis 46 is a drive gear 50. The drive gear 50 is disposed near the center of the flywheel assembly 40. The flywheel assembly 40 includes a housing 56 to which the two sections of the front cross frame element 20 rigidly mount. Within the housing 56 is contained a flywheel 60. Referring to FIG. 3 in conjunction with FIG. 2, it can be seen that the flywheel 60 is annular in shape having an inner diameter surface 61 and an outer diameter surface 62. An orbital gear 64 is disposed along the inner diameter surface 61. A plurality of planetary gears 66 are disposed between the drive gear 50 in the center of the drive axis and the orbital gear 64. The planetary gears 66 are centered on axles 67 that are affixed to the housing 56. As a result, when the drive gear 50 turns, the planetary gears 66 turn and the flywheel 60 is caused to turn. The shown embodiment of four planetary gears is merely exemplary and it will be understood that any known gearing arrangement can be used to interconnect the flywheel 60 to the drive axis.

As is seen from FIG. 3, a drive sprocket 68 is rigidly mounted to the flywheel 60. A chain 69 extends around the drive sprocket 68 and joins the flywheel 60 with sprocket assembly 70 on the hub of the rear drive wheel 16. The sprocket assembly 70 consists of a series of concentric slave sprockets 72, 73, 74 and a free rotating sprocket 76. The slave sprockets 72, 73, 74 are ratcheted and engage the hub of the rear drive wheel 16 when the rear drive wheel is rotating in the clockwise direction. The free rotating sprocket 76 rotates independently of the rear drive wheel 16 regardless of the rotational speed of rear the drive wheel 16 or its direction of rotation. Although three slave sprockets are shown, it will be understood that and known type of hub gearing can be used in conjunction with the rear drive wheel 16. Such hub gearing is well known in the bicycle arts and can include open gearing, as is shown, or enclosed internal gears that engage the hub.

A chain positional changer 78 and tensioner 80 extend below the sprocket assembly 70. The chain positional changer 78 is similar to that used in the prior art for bicycles and is controlled by a cable 80. When the chain 69 is positioned on the free rotating sprocket 76, the flywheel 60 is free to rotate, but none of the rotational movement from the flywheel 60 is transferred to the rear drive wheel 16. When the chain 69 is positioned on the free rotating sprocket 76, the wheel chair assembly 10 is effectively in neutral, wherein the flywheel 60 and the rowing levers have no effect on the rear drive wheel 16. Conversely, when the chain 69 is positioned on one of slave sprockets 72, 73, 74, the rotational energy of the flywheel 60 is transferred to the rear drive wheel 16, thereby causing the wheelchair assembly 10 to move forward. In situations when the rotational speed of the rear drive wheel 16 surpasses that of the flywheel 60, as compensated for sprocket size difference, then the momentum of the wheelchair assembly 10 can be used to rotate the flywheel 60. The rotating flywheel 60 stores such surplus energy until the flywheel's energy can be used to drive the slower drive wheel 16.

It should therefore be understood that when the chain 69 is positioned on the free rotating sprocket 76, the flywheel 60 can be rotated by use of the rowing levers 42, 44 (FIG. 1). By pumping the rowing levers 42, 44 (FIG. 1), the speed of the flywheel 60 can be increased without the wheelchair assembly 10 moving. As such, when a person in the wheelchair assembly 10 is at a dead stop, the flywheel 60 can be driven to a high rate of speed. The energy stored in the flywheel 60 can then be used to help move the flywheel 60 from the dead stop by moving the chain 69 from the free rotating sprocket 76 to one of the slave sprockets 72, 73, 74.

Returning to FIG. 1, it can be seen that various cable controls are disposed at the ends of the rowing levers 42, 44. On the right rowing lever 42 are two handles 82, 84. The first handle 82 is coupled to a cable 80 that extends to the chain positional changer 78 (FIG. 3). When the first handle 82 is depressed, the cable 86 is pulled taut and the chain positional changer 78 moves the chain 69 onto the free rotating sprocket 76. As a result, the first handle 82 acts as a clutch control that disengages the flywheel 60 from the rear drive wheel 16. A person sitting in the wheelchair assembly 10 would therefore only need to squeeze the first handle 82 on the right rowing lever 42 to disengage the flywheel drive when coming to a stop.

The second handle 84 on the right rowing lever 42 and the two handles 86, 88 on the left rowing lever 44 are for braking and steering. The second handle 84 on the right rowing lever 42 is positioned so as to be easily engaged by the thumb of a person grasping the right rowing lever 42. The second handle 84 on the right rowing lever 42 is coupled to a cable 85 that extends to brake calipers 89 that engage the right side wheel 14. As such, when the second handle 84 on the right rowing lever 42 is partially engaged, the right side wheel 14 is slowed by the brake caliper 89 and the wheelchair assembly 10 turns right. Conversely, the second handle 88 on the left rowing lever 44 is positioned so as to be easily engaged by a person grasping the left rowing lever 44. The second handle 88 on the left rowing lever 44 is coupled to a cable that extends to break calipers (not shown) that engage the left side wheel 12. When the second handle 88 on the left rowing lever 44 is partially engaged, the left side wheel 12 is slowed by the brake calipers 90 and the wheelchair assembly 10 turns left.

The first handle 86 on the left rowing lever 44 is coupled to a cable that extends to brake calipers 96 that engage the rear drive wheel 16. As a result, when the first handle 86 on the left rowing lever 44 is engaged, the forward movement of the wheelchair assembly 10 is stopped.

The end section 98 of the left rowing lever 44 is an independent unit that can be rotated around the longitudinal axis of the left rowing lever 44. A cable 81 is affixed to the end section 98, whereby the rotation of the end section 98 either tightens or loosens the cable 81. The cable 81 extends down to the chain positional changer 78, wherein the tension on the cable 81 determines which of the slave sprockets will be engaged by the chain 69, in a typical prior art fashion.

Figure 4:
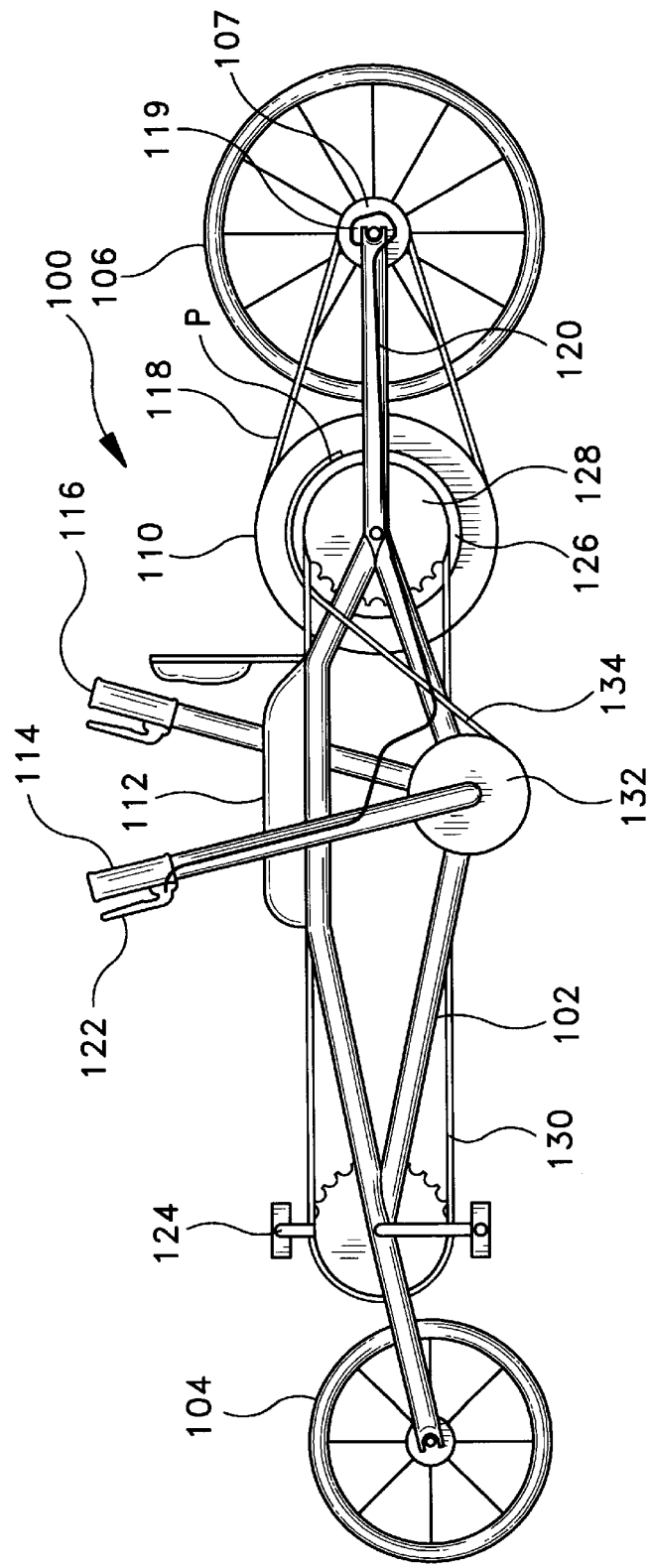
FIG. 4 is a side view of an alternate embodiment of the present invention vehicle.

Referring now to FIG. 4, an alternate embodiment of the present invention is shown in the form of a low profile recumbent vehicle 100. In this embodiment, the recumbent vehicle is driven with both leg and arm power with the assistance of a flywheel 110 in order to raise efficiency. In this embodiment, a frame 102 connects a single front wheel 104 to a single rear wheel 106. The frame 102 supports a seat 112 at a point between the front wheel 104 and the rear wheel 106. Two rowing levers 114, 116 extend upwardly along the sides of the seat 112, wherein each of the rowing levers 114, 116 is pivotably coupled to the frame 102.

The flywheel 110 is rotatably mounted to the frame 102 at a point between the seat 112 and the rear wheel 106. A drive belt 118 or chain joins the flywheel 110 to a drive hub 107 on the rear wheel 106. As such, any rotation of the flywheel 110 causes a rotation of the rear wheel 106. The drive hub 107 of the rear wheel 106 contains a clutch mechanism 119 activated by a control cable 120. The control cable 120 extends to an activation handle 122 on one of the rowing levers 114, 116. As a result, by squeezing the activation handle 122 on one of the rowing levers 114, 116, the drive hub 107 can be made to disengage the rear wheel 106, thereby disengaging the flywheel 110 from the rear wheel 106. It should be understood that the driver of the recumbent vehicle can selectively engage and disengage the flywheel 110 from the rear wheel 106 so that the flywheel 110 can selectively be used to drive the rear wheel 106.

Other than receiving rotational energy from the rear wheel 106, the flywheel 110 can be driven by either the rowing levers 114, 116 or an optional set of pedals 124 positioned between the seat 112 and the front wheel 104. Two ratcheted sprockets 126, 128 are coupled to the side of the flywheel 110. The larger sprocket 126 is ratcheted to the flywheel 110 in a manner so that the larger sprocket 126 would only engage the flywheel 110 if the larger sprocket 126 were rotating in the counterclockwise direction at a rotational speed that surpasses that of the flywheel 110. The smaller sprocket 128 is also ratcheted to the flywheel 110 in a manner so that the smaller sprocket 128 would only engage the flywheel 110 if the smaller sprocket 128 were rotating in the counterclockwise direction at a rotational speed higher than that of the flywheel 110. Consequently, the larger sprocket 126 and the smaller sprocket 128 can only serve to add rotational energy to the flywheel 110.

The larger sprocket 126 is coupled to the optional set of pedals 124 by a chain 130. Consequently, when the pedals 124 are pumped by the legs of the person sitting on the recumbent vehicle, rotational energy can be added to the flywheel 110 provided the chain 130 drives the large sprocket 126 at a rotational speed greater than that of the initial speed of the flywheel 100.

Arcuate forms 132 are disposed at the bottom of each of the rowing levers 114, 116. A chain 134 is joined to the exterior of each arcuate form 132 and wraps around the smaller sprocket 128. In addition to the smaller sprocket 128 being ratcheted to the flywheel 110, the smaller sprocket 128 is biased by a spring (not shown) into a predetermined rotational orientation, wherein shown chain attachment point P is at the two o'clock position. As the rowing levers 114, 116 are pulled, the chain 134 is pulled taut and the smaller sprocket 128 is rotated out of its predetermined rotational orientation. If the smaller sprocket 128 is rotated at a speed greater than that of the flywheel 110, then rotational energy is added to the flywheel 110. After the stroke of each rowing lever 114, 116 is complete and chain 134 is made slack, the smaller sprocket 128 returns to its predetermined rotational orientation ready for another stroke.

In the shown embodiment, the steering for the recumbent vehicle 100 is achieved by the rider shifting his/her weight.

However, other more direct steering devices could be coupled to the front wheel 104. Braking is achieved by providing braking calipers (not shown) for the rear wheel 106, front wheel 104 or the flywheel 110.

It will be understood that both embodiments of the present invention explained above are exemplary and a person skilled in the art can make many variations to the invention to produce alternate embodiments not specifically described. For instance, in the above description, a wheelchair and a recumbent vehicle were described, however, any other human powered vehicle could also be configured. Also, the present invention, as described, makes use of chains and sprockets to drive the wheels and flywheel. It will be understood that belts and pulleys could also be used. All such alternate embodiments and modifications are intended to be covered by the scope of the present invention as defined by the appended claims.

What is claimed is:

1. A manually powered vehicle comprising:
   a frame;
   at least one seat supported by said frame;
   at least one drive wheel coupled to said frame;
   a first side wheel disposed on one side of said seat and a second side wheel disposed on an opposite side of said seat;
   a flywheel coupled to said frame, wherein said flywheel stores rotational momentum and is capable of rotating independently of said at least one drive wheel;
   a coupling mechanism for selectively coupling said flywheel to said at least one drive wheel, whereby rotational movement can be exchanged between said flywheel and said at least one drive wheel; and
   two rowing levers mechanically coupled to said flywheel, wherein one of said rowing levers is disposed on either side of said seat and the manual manipulation of said rowing levers adds rotational momentum to said flywheel.

2. The vehicle according to claim 1, wherein said manually powered vehicle is a wheelchair.

3. The vehicle according to claim 2, wherein said flywheel is disposed below said seat and between said two side wheels.

4. The vehicle according to claim 3, wherein said at least one drive wheel is disposed at a point behind said seat.

5. The vehicle according to claim 1, wherein said first side wheel and said second side wheel are angled away from said seat, thereby providing clearance for said rowing levers.

6. The vehicle according to claim 1, wherein a drive shaft engages said flywheel and each of said rowing levers engages said drive shaft with a ratchet connection, whereby each of said rowing levers engages and rotates said drive shaft and said flywheel only when manually moved in one direction.

7. The vehicle according to claim 1, wherein said vehicle has a single drive wheel disposed at a point behind said seat that is generally equidistant from said first side wheel and said second drive wheel.

8. The vehicle according to claim 7, wherein said drive wheel contains a hub assembly with at least one slave sprocket therein and said flywheel contains a drive sprocket thereon, wherein said drive sprocket connects to said hub assembly with a chain.

9. The vehicle according to claim 8, wherein said hub assembly includes at least one neutral sprocket that does not engage said drive wheel.

10. The vehicle according to claim 9, wherein said coupling mechanism for selectively coupling said flywheel to said drive wheel includes a chain positioning device that selectively changes the position of said drive chain on said hub assembly between said at least one slave sprocket and at least one neutral sprocket.

11. The vehicle according to claim 1, further including means for steering said wheelchair disposed on said rowing levers.

12. A wheelchair comprising;
    a frame;
    a seat coupled to said frame;
    at least three wheels supporting said frame, wherein at least one of said at least three wheels is a drive wheel;
    a flywheel supported by said frame, wherein said flywheel is capable of rotating independently of said drive wheel for storing rotational momentum;
    at least one rowing lever accessible from said seat and selectively coupled to said flywheel, for manually rotating said flywheel; and
    a mechanism for selectively coupling said flywheel to said drive wheel, wherein rotational momentum stored by said flywheel is selectively transferred to said drive wheel.

13. The wheelchair according to claim 12, wherein a drive shaft engages said flywheel and said at least one rowing lever engages said drive shaft with a ratchet connection, whereby each of said at least one rowing lever engages and rotates said drive shaft only when manually moved in one direction.

14. The wheelchair according to 12, further including a transmission disposed between said flywheel and said drive wheel for selectively altering a rotational ratio between said flywheel and said drive wheel.

\* \* \* \* \*